United States Patent [19]

Bertram

[11] Patent Number: 4,757,639
[45] Date of Patent: Jul. 19, 1988

[54] POWER SNARE

[76] Inventor: Bruce H. Bertram, Box 172, Birtle, Manitoba, Canada, R0M 0C0

[21] Appl. No.: 19,033

[22] Filed: Feb. 26, 1987

[30] Foreign Application Priority Data

Jun. 27, 1986 [CA] Canada .................................. 512688

[51] Int. Cl.⁴ .......................................... A01M 23/34
[52] U.S. Cl. ............................................ 43/87; 43/85
[58] Field of Search ................................ 43/85, 86, 87

[56] References Cited

U.S. PATENT DOCUMENTS

| | | | |
|---|---|---|---|
| 1,716,959 | 6/1929 | Hendrickson | 43/85 |
| 2,485,703 | 10/1949 | Christoffer . | |
| 2,537,894 | 1/1951 | Haviland . | |
| 3,060,623 | 10/1962 | Aldrich | 43/87 |
| 3,176,426 | 4/1965 | Counts . | |
| 3,276,159 | 10/1966 | Robards | 43/87 |
| 3,837,110 | 9/1974 | Coquyt . | |
| 3,958,360 | 5/1976 | King | 43/87 |
| 4,069,612 | 1/1978 | King . | |
| 4,171,589 | 10/1979 | Brownlie . | |
| 4,279,093 | 7/1981 | Iddings . | |
| 4,329,805 | 5/1982 | Novak . | |
| 4,471,559 | 9/1984 | Thébeau . | |
| 4,581,843 | 4/1986 | Fremont | 43/87 |

FOREIGN PATENT DOCUMENTS

| | | | |
|---|---|---|---|
| 8030 | of 1907 | United Kingdom | 43/87 |
| 5535 | of 1909 | United Kingdom | 43/87 |
| 24209 | of 1915 | United Kingdom | 43/87 |
| 364029 | 12/1931 | United Kingdom | 43/87 |
| 376262 | 6/1932 | United Kingdom | 43/87 |
| 41452448 | 8/1936 | United Kingdom | 43/87 |

Primary Examiner—Kurt Rowan
Attorney, Agent, or Firm—Ciotti & Murashige, Irell & Manella

[57] ABSTRACT

Animal traps are usually difficult to sterilize in order to remove human odor therefrom and difficult to hide when setting and often contain moving parts, tubes, pins and the like. The present device consists of a pair of spring arms made of heavy wire with a hairpin spring at the junction thereof. Eye loops are formed one on each distal end of the arms and one of these has a slotted semi-circular plate welded otherwise secured into the base of the eye. A freely running snare loop is provided on one end of a standing part, in which part extends through the slot in the disk or plate and through a cotter pin assembly spanning the other eye and terminates with a ferrule outboard of the other eye. A trigger block is secured to the standing part inboard of the slotted disk when the trap is set with the two arms close together and being urged apart by the spring. The snare loop is adjustable to catch the shoulders of the animal, and the movement thereof disengages the trigger block from the slotted disk and allows the arms to spring apart tightening the snare loop and striking the animal a heavy blow with the eye of the one arm.

14 Claims, 1 Drawing Sheet

U.S. Patent    Jul. 19, 1988    4,757,639
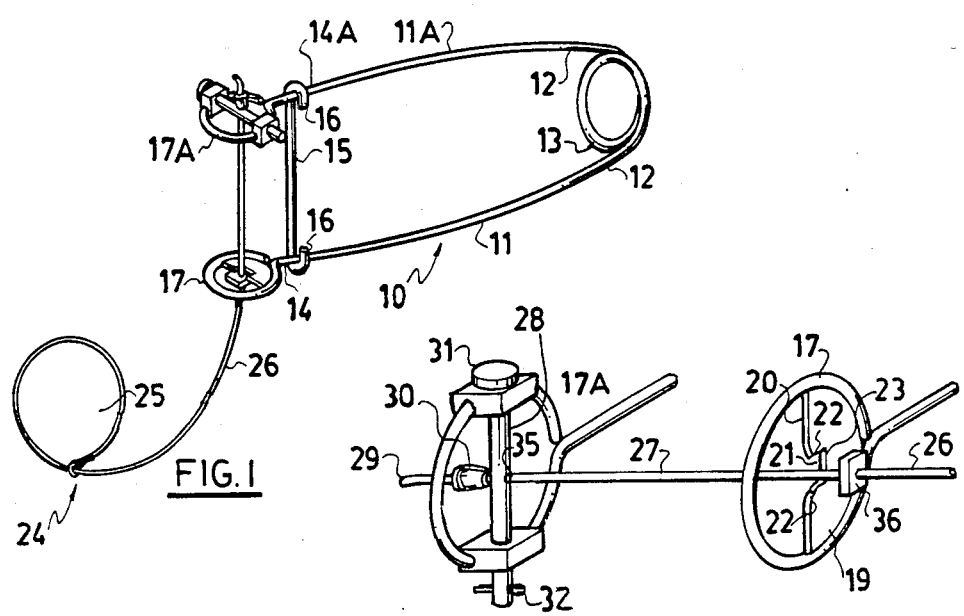
FIG.1
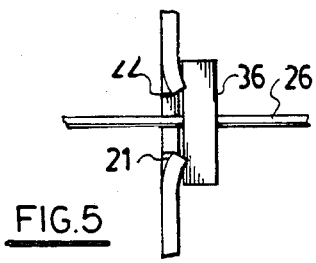
FIG.2
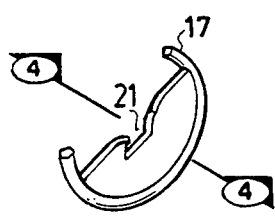
FIG.3
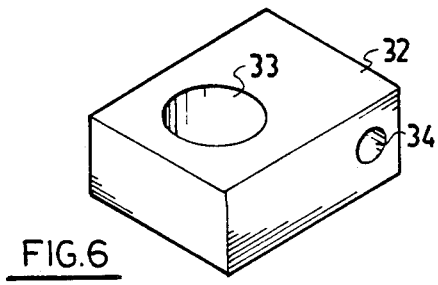
FIG.5
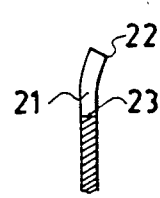
FIG.4
FIG.6

POWER SNARE

BACKGROUND OF THE INVENTION

This invention relates to new and useful improvements in snare type traps.

Such traps normally suffer from many disadvantages. Weight plays an important part on the selection of a trap because such traps often have to be transported under severe weather conditions.

Secondly, traps used to catch canine type animals must be dyed and waxed to remove and prevent any human odours from remaining and traps with hollow tubing, pipes or other involved trigger mechanisms are difficult to sterilize for this purpose.

PRIOR ART

The following patents are known to applicant.

U.S. Pat. No. 2,537,894. This illustrates a support to hold the noose upright.

U.S. Pat. No. 2,485,703. This discloses a livestock tool for catching and holding livestock and is manually operated. This shows a noose which is tightened and elevated above the ground once triggered and the trigger actuating means can be positioned in any desired relationship to the ground, runway or den entrance.

U.S. Pat. No. 3,837,110 shows a snare loop with a telescoping locking mechanism for holding the arms in the loaded position which can be released when the trigger is actuated.

U.S. Pat. No. 4,069,612 shows a pair of rod like spring loaded arms with a snare loop extended therebetween.

U.S. Pat. No. 4,171,589 shows a pair of arms with a coil spring therebetween and a snare loop operated by the trigger mechanism in a different manner to the present invention.

U.S. Pat. No. 4,279,093 shows a pair of spring arms which actuates a bar slideable along a metal frame which acts as the catching mechanism.

U.S. Pat. No. 4,329,805 shows a snare loop actuated by a spring arm which lifts the loop from the ground and around the leg of the animal when triggered.

U.S. Pat. No. 4,471,559 discloses a coil spring mounted on a frame and having its ends spread apart when set. One end of the spring is held by a latch which, when released, permits the two arms of the spring to move together in a vertically situated frame.

BRIEF DESCRIPTION OF THE INVENTION

The present trap presents the smallest possible metal area. This is important because wild animals are reluctant to approach anything odd in its natural environment and many traps are difficult to conceal because of their size. The present trap overcmess these disadvantages by providing a trap with very few moving parts and no tubes or pivoted trigger attachments being required.

The trap has the smallest possible metal area so that it is easy to conceal due to its wire type construction.

The simple trigger mechanism is unlikely to jam in use and all that is required to change the cable snares is a pair of pliers.

It also enables the snare loop to be set at any size and although not part of the invention, it may be provided with a stop to limit the smallest loop size thereby preventing smaller animals being caught thereby.

One aspect of the invention is to provide an animal trap comprising in combination a pair of arms, a heavy duty hairpin spring joining said arms by one end thereof and normally urging the distal ends of said arms apart, and an eye loop formed on the distal end of each of said arms, a free running snare loop formed in one end of a standing part of a snare wire, the distal end portion of said standing part extending through one of said eye loops and means to detachably retain said distal end in the other of said eye loops, trigger means in said one eye loop cooperating with said standing part to detachably hold said eye loops juxtaposed with one another in a "set" position whereby said eye loops are urged apart from one another by said spring and when said trigger means is released.

Another advantage of the invention is to provide a trap which is extremely simple in construction thereby reducing the possibility of failure during use.

The trigger assembly is extremely weatherproof inasmuch as there are no cams or moving pins which may freeze up in severe weather.

A further advantage is to provide a device of a character herewithin described which is lightweight, economical to manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

FIG. 1 is a side elevation of the trap with the safety link in position.

FIG. 2 is an enlarged isometric view of the eye loops of the trap in the "set" position.

FIG. 3 is an enlarged isometric view of the trigger plate per se.

FIG. 4 is a section along the line 4—4 of FIG. 3.

FIG. 5 is a top plan view of the trigger plate and trigger block in position.

FIG. 6 is an isometric view of one of the cotter pin attachment blocks.

In the drawings like characters of reference indicate corresponding parts in the different figures.

DETAILED DESCRIPTION

Proceeding therefore to describe the invention in detail, reference should be made to the drawings in which 10 illustrates the trap generally which consists of two arms 11 and 11A made of spring steel and joined at the inner ends 12 thereof by means of a hairpin spring 13 which normally urges the distal ends 14 and 14A apart.

A safety link 15 is provided having hooks 16 on each end and which engages over the arms 11 and 11A adjacent the distal ends thereof for transportation, storage and setting purposes.

Each distal end 14 and 14A is provided with an eye loop 17 and 17A respectively shown in enlarged form in FIG. 2.

The eye loop 17 is provided with a semi-circular disk 18 which is secured as by welding or other means, to and across the base 19 of this eye loop. This semi-circular disk 18 is provided with a free edge 20 having a slot 21 formed therein intermediate the ends of this free edge and defined by the vertical sides 22 formed by removing a rectangular portion therefrom, said slot terminating in a closed base 23 as clearly shown.

FIGS. 3, 4 and 5 show that the outer ends of these sides 2 are bent slightly outwardly or away from the other eye loop 17A, the purpose of which will hereinafter become apparent.

A snare loop assembly 24 is provided of snare wire having a freely sliding snare loop 25 formed on a standing part 26. This standing part is provided with a distal end portion 27 which passes through the eye 17 and also through the slot 21 in the semi-circular plate or disk 18.

It then passes through the other eye loop 17A and through a cotter pin assembly collectively designated 28 secured across this eye loop, terminating in a distal end 29 upon which a ferrule or stop 30 is provided.

The cotter pin assembly consists of a cotter pin 28 having a head 31, and a spring pin closure 32 engageable through an aperature formed in the distal end of the cotter pin 28.

This cotter pin is secured to the eye by blocks 32 which are aperatured as at 33 to allow the cotter pin 28 to pass therethrough. Drillings 34 at right angles to the aperatures 33 engage the opposite sides of the eye loops 17A as clearly shown.

The distal end portion 27 of the snare cable passes through an aperature 35 in the cotter pin 28 and the snare wire is retained by the stop ferrule 30 as hereinbefore described.

Not illustrated is a stop on the snare loop limiting the smallest size that the loop can form thus preventing smaller animals then desired from being trapped by the device.

In operation, the safety link 15 is engaged around the arms to hold the loops 17 and 17A in adjacent position as clearly shown.

A trigger block 36 is secured to the snare cable spaced inwardly from the distal end thereof and is engaged in a position spanning the slot 21 and outboard of the semi-circular disk 18. When the safety link is removed, the spring urges the arms apart and these are restrained by the ferrule 30 on the one side and the trigger block 36 on the other.

The snare loop is set to the desired diameter and the trap is located in the chosen position.

An animal large enough to spring the trap, engages its head through the snare loop 25 until the shoulders thereof are restrained by the snare loop. This movement disengages the trigger block 36 from the sides of the slot thus releasing the trap and in this connection the aforementioned inclination of the sides 22 provides a slightly positive set to the trap thus preventing inadvertent disengagement by a smaller animal passing through the snare loop.

The release of the trap enables the heavy duty hairpin spring 13 to move the arms apart rapidly whereupon the eye loop 17 engages the snare loop and tightens same and at the same time strikes the animal a severe blow in the neighborhood of the head, both of which cause a humane killing of the animal.

Since various modifications can be made in my invention as hereinabove described, and many apparently widely different embodiments of same made within the spirit and scope of the claims without departing from such spirit and scope, it is intended that all matter contained in the accompaying specification shall be interpreted as illustrative only and not in a limiting sense.

I claim:

1. An animal trap comprising in combination a pair of arms, a heavy duty hairpin spring joining said arms by one end thereof and normally urging the distal ends of said arms apart, and an eye loop formed on the distal end of each of said arms, a free running snare loop formed in one end of a standing part of a snare wire, the distal end portion of said standing part extending through one of said eye loops and means to detachably retain said distal end in the other of said eye loops, trigger means in said one eye loop cooperating with said standing part to detachably hold said eye loops juxtaposed with one another in a "set" position whereby said eye loops are urged apart from one another by said spring means when said trigger means is released, said trigger means comprising a trigger plate secured across part of said one eye and having a free edge, a slot formed in said free edge and a trigger block secured to said standing part of said snare wire and spanning said slot when said trap is in the "set" position, with said standing end passing through said slot.

2. The trap according to claim 1 in which the portion of said trigger plate defining the sides of said slot are inclined towards the outer side of said one eye thus giving a slightly positive "set" to said block when engaged therewith.

3. The trap according to claim 1 in which said means to detachably retain said distal ends in the other of said eye loops includes a cotter pin assembly spannng said other eye loop and being secured thereto, said distal end of said standing part engaging through said cotter pin of said assembly and stop means on said distal end outboard of said cotter pin.

4. The trap according to claim 2 in which said means to detachably retain said distal ends in the other of said eye loops includes a cotter pin assembly spanning said other eye loop and being secured thereto, said distal end of said standing part engaging through said cotter pin of said assembly and stop means on said distal end outboard of said cotter pin.

5. The trap according to claim 1 which includes a detachable safety link engaging said arms adjacent said eye loops to hold said arms in the "set" position for transportation and storage purposes and to assist in setting said trap.

6. The trap according to claim 2 which includes a detachable safety link engaging said arms adjacent said eye loops to hold said arms in the "set" position for transportation and storage purposes and to assist in setting said trap.

7. The trap according to claim 3 which includes a detachable safety link engaging said arms adjacent said eye loops to hold said arms in the "set" position for transportation and storage purposes and to assist in setting said trap.

8. The trap according to claim 4 which includes a detachable safety link engaging said arms adjacent said eye loops to hold said arms in the "set" position for transportation and storage purposes and to assist in setting said trap.

9. An animal trap comprising in combination a pair of arms, a heavy duty hairpin spring joining said arms by one end thereof and normally urging the distal ends of said arms apart, and an eye loop formed on the distal end of each of said arms, a free running snare loop formed in one end of a standing part of a snare wire, the distal end portion of said standing part extending through one of said eye loops and means to detachably retain said distal end in the other of said eye loops, trigger means in said one eye loop cooperating with said standing part to detachably hold said eye loops juxtaposed with one another in a "set" position whereby said eye loops are urged apart from one another by said spring means when said trigger means is released, said means to detachably retain said distal ends in the other of said eye loops includes a cotter pin assembly spanning said other eye loop and being secured thereto, said distal end of said standing part engaging through said cotter pin of said assembly and stop means on said distal end outboard of said cotter pin.

10. The trap according to claim 9 in which said trigger means comprises a trigger plate secured across part of said one eye and having a free edge, a slot formed in said free edge and a trigger block secured to said standing part of said snare wire and spanning said slot when said trap is in the "set" position, with said standing end passing through said slot.

11. The trap according to claim 9 in which the portion of said trigger plate defining the sides of said slot are inclined towards the outer side of said one eye thus giving a slightly positive "set" to said block when engaged therewith.

12. The trap according to claim 11 which includes a detachable safety link engaging said arms adjacent said eye loops to hold said arms in the "set" position for transportation and storage purposes and to assist in setting said trap.

13. The trap according to claim 9 which includes a detachable safety link engaging said arms adjacent said eye loops to hold said arms in the "set" position for transportation and storage purposes and to assist in setting said trap.

14. The trap according to claim 13 which includes a detachable safety link engaging said arms adjacent said eye loops to hold said arms in the "set" position for transportation and storage purposes and to assist in setting said trap.

* * * * *